United States Patent [19]

Sandberg et al.

[11] 4,276,753
[45] Jul. 7, 1981

[54] CRYOGENIC FREEZING TUNNEL CONTROL SYSTEM

[75] Inventors: Glenn A. Sandberg, Lockport; Wilbur A. Janssen, New Lenox, both of Ill.

[73] Assignee: Formax, Inc., Mokena, Ill.

[21] Appl. No.: 150,893

[22] Filed: May 19, 1980

[51] Int. Cl.³ ............................................. F25D 17/04
[52] U.S. Cl. ...................................... 62/186; 62/208; 62/380
[58] Field of Search ................. 62/186, 203, 208, 374, 62/380

[56] References Cited

U.S. PATENT DOCUMENTS

| | | | |
|---|---|---|---|
| 3,403,527 | 10/1968 | Berreth et al. | 62/380 |
| 3,427,820 | 2/1969 | Hart | 62/380 |
| 3,757,533 | 9/1973 | Kent | 62/380 |
| 3,889,488 | 6/1975 | Maeda et al. | 62/374 |
| 3,892,104 | 7/1975 | Klee et al. | 62/380 |
| 3,898,863 | 8/1975 | Wagner | 62/374 |
| 4,075,869 | 2/1978 | Fitsall | 62/380 |
| 4,128,164 | 12/1978 | Sandberg | 62/380 |
| 4,142,376 | 3/1979 | Sandberg | 62/158 |
| 4,171,625 | 10/1979 | Morgan et al. | 62/380 |
| 4,175,396 | 11/1979 | Miller et al. | 62/374 |

*Primary Examiner*—Ronald C. Capossela
*Attorney, Agent, or Firm*—Kinzer, Plyer, Dorn & McEachran

[57] ABSTRACT

A cryogenic food product freezing tunnel including an elongated housing having a food product entrance at one end, a food product exit at the other end, a food product conveyor extending through the tunnel, a cryogen input near the food product exit, an exhaust stack near the food product entrance with an exhaust blower atop the stack, a plurality of cryogen circulating fans spaced along the length of the tunnel, a variable speed directional blower intermediate the cryogen input and the food product entrance, a cryogen input control, and a temperature sensor positioned between the directional blower and the cryogen input. The improved cryogen gas flow control system of the invention comprises a variable speed drive for the exhaust blower and a blower speed control, connected to the temperature sensor, that varies the speeds of both the directional blower and the exhaust blower as functions of the temperature sensed by the temperature sensor; the blower speed control is also a part of the cryogen input control, and varies the cryogen input, again as a function of the sensed temperature.

6 Claims, 3 Drawing Figures

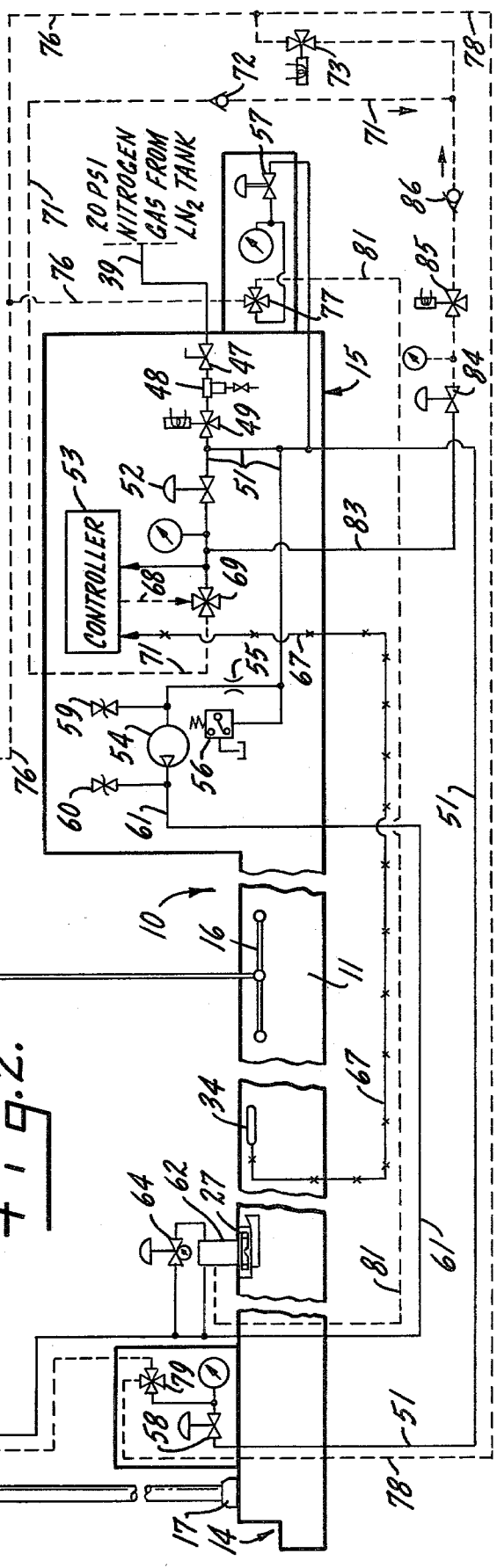

CRYOGENIC FREEZING TUNNEL CONTROL SYSTEM

BACKGROUND OF THE INVENTION

Food products of various kinds and types are frequently frozen in cryogenic freezing tunnels; such a freezing tunnel comprises an elongated housing with a food product entrance at one end and an exit at the other end and a conveyor extending throughout the length of the tunnel. A spray header discharges a liquified cryogen gas, usually liquified nitrogen, onto the food product at a cryogen input position near the food product exit. The cryogen gas is exhausted from the entrance end of the tunnel through an exhaust stack equipped with an exhaust blower. Throughout the length of the tunnel, circulating fans deflect the cryogen gas into contact with the food product. Practical and advantageous mechanical constructions for cryogenic food product freezing tunnels of this kind are disclosed in Kent U.S. Pat. No. 3,757,533 issued Sept. 11, 1973 and Morgan et al U.S. Pat. No. 4,171,625 issued Oct. 23, 1979. A highly advantageous tunnel control system is disclosed in Sandberg U.S. Pat. No. 4,142,376 issued Mar. 6, 1979. Other prior art of interest in connection with the present invention, concerned primarily with control of the flow of cryogen gas within the tunnel, includes Berreth et al U.S. Pat. No. 3,403,527 issued Oct. 1, 1968 and Klee et al U.S. Pat. No. 3,892,104 issued July 1, 1975.

A basic problem in the operation of any such continuous-flow cryogenic freezing tunnel derives from leakage of the cryogen gas into the workspace in which the tunnel is located through either the product exit end or the product entrance end, since both are partially open during operation. In part, this is a problem of control of the flow of cryogen into the tunnel; whenever the input of liquified nitrogen or other cryogen is excessive, a cold gas discharge from either or both ends of the tunnel may occur. The leakage problem is also partly one of proportionate flow within the tunnel. In particular, too much cryogen gas flow toward the product exit end of the tunnel can create leakage even if the inflow of liquified cryogen is not excessive. Gas leakage presents a substantial problem in maintenance of an appropriate ambient temperature in the workspace around the tunnel and may present a health hazard to workers near the tunnel.

Another continuing problem of substantial difficulty, relative to continuous-feed cryogenic freezing tunnels, pertains to efficiency in use of the cryogen. If too little cryogen is provided, the freezing of the food product is inadequate, with a consequent loss of quality and possible spoilage. If too much cryogen is supplied, on the other hand, the tunnel operation becomes economically wasteful, even if the tunnel exhaust successfully prevents escape of the cryogen gas into the workspace adjacent the tunnel. Again, the efficiency problem is not merely one of control of the quantity of liquid cryogen entering the tunnel; the flow of cryogen gas within the tunnel and the rate of removal of gas from the tunnel through the exhaust stack are both important factors affecting the efficiency of tunnel operation.

Some partial solutions to these difficulties are presented in the prior art noted above. Thus, the Berreth et al and Klee et al patents provide variable speed blowers and/or variable damper arrangements within the tunnel itself to control the proportionate flow of gas from the cryogen input location toward the exit and entrance ends of the tunnel, based primarily upon sensing of the rate of input of the liquified cryogen. The Morgan et al patent incorporates adjustable dampers in the entrance end of the tunnel, as a part of the tunnel exhaust system, controlling the exhaust of cryogen gas from the tunnel. That damper arrangement, however, causes variable withdrawal of air from the workspace around the tunnel, and consequently may impose substantial burdens on heating or cooling systems serving that workspace, depending upon the geographic location and the time of year.

SUMMARY OF THE INVENTION

It is a principal object of the present invention, therefore, to provide a new and improved cryogen gas flow control system that controls both the movement of cryogen gas within the tunnel and the rate of exhaust of cryogen gas from the tunnel in a manner that minimizes the problems discussed above and provides for maximum overall efficiency of tunnel operation.

A specific object of the invention is to provide a new and improved cryogen gas flow control system for a cryogenic food product freezing tunnel that effectively minimizes leakage of the cryogen gas from both the entrance and exit ends of the tunnel.

Another object of the invention is to provide a new and improved cryogen gas flow control system for a cryogenic food product freezing tunnel that effectively minimizes or eliminates any draw-off of air from the workspace in which the tunnel is located.

A further object of the invention is to provide a new and improved cryogen gas movement control system for a cryogenic food product freezing tunnel that is simple and economical in construction, that is highly efficient in utilization of the cryogen, and that incorporates a single, unified control for cryogen input, directional blower speed, and exhaust blower speed.

Accordingly, the invention relates to a cryogenic food product freezing tunnel of the kind comprising an elongated tunnel housing, conveyor means extending through the housing to transport food product from a product entrance end to a product exit end, cryogen input means to introduce a cryogen into the tunnel at a cryogen input location near the exit end, exhaust means, including an exhaust stack and an exhaust blower at the top of the stack, to exhaust cryogen gas from a location near the entrance end of the tunnel, a plurality of circulating fans at spaced locations along the length of the tunnel for deflecting vaporized cryogen into contact with food product traversing the tunnel, a directional control blower, including a variable speed drive, mounted in the tunnel between the cryogen input location and the entrance end, and cryogen input control means, including a temperature sensor located between the directional control blower and the cryogen input location, for controlling the rate of input of cryogen into the tunnel. The improved cryogen gas flow control system of the invention comprises a variable speed drive for the exhaust blower and unified blower speed control means for varying the speed of the directional control blower and the speed of the exhaust blower as functions of the temperature in the tunnel, taken at a position intermediate the cryogen input location and the position of the directional blower.

BRIEF DESCRIPTION OF THE DRAWINGS

FIG. 2 is a schematic diagram of the gas flow control system for the cryogenic food product freezing tunnel of FIG. 1; and FIG. 3 is an explanatory diagram showing alternate flow conditions for Manual-Automatic mode control valves used in the system of FIG. 2.

DESCRIPTION OF THE PREFERRED EMBODIMENT

Figure 1:
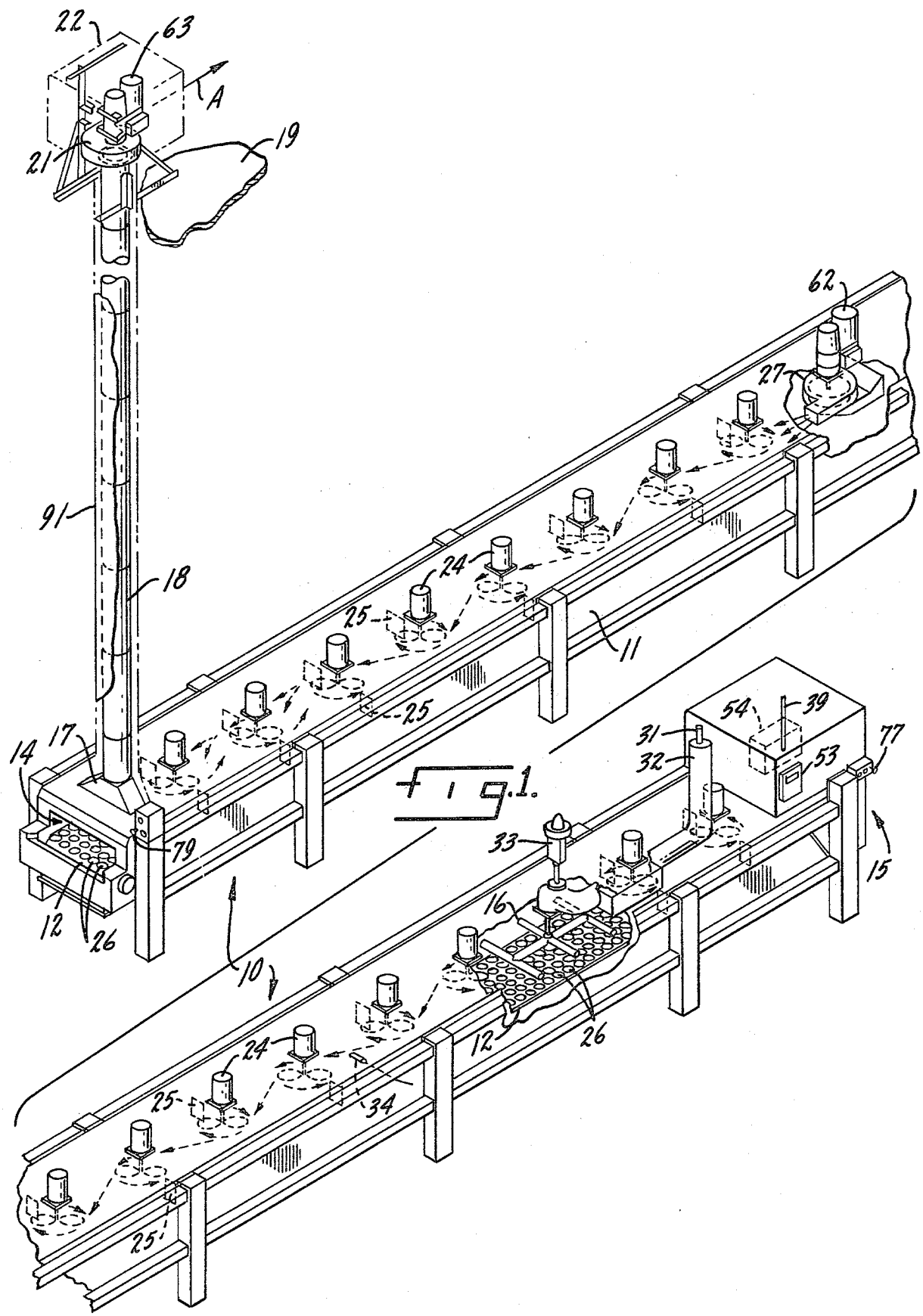
FIG. 1 is a perspective view, partially cut away and partially schematic, of a cryogenic food product freezing tunnel that incorporates an improved cryogen gas flow control according to the present invention.

FIG. 1 illustrates a cryogenic food product freezing tunnel 10 including an elongated tunnel housing 11 through which a food product conveyor 12 extends from a food product entrance end 14 to an exit end 15. Within tunnel housing 12, a cryogen spray header 16 or other suitable cryogen input means is provided for introducing a liquified cryogen into the tunnel; the spray header 16 is located near the tunnel exit 15. Typically, the cryogen is liquified nitrogen ($LN_2$).

At the entrance end 14 of tunnel 10, an exhaust plenum 17 is connected to an exhaust stack 18 that extends up through the building roof 19. An exhaust blower 21 is mounted at the top of stack 18. In the illustrated construction, there is a rain-proof housing 22 over the top of stack 18; blower 21 exhausts cryogen gas to the atmosphere as generally indicated by arrow A.

Tunnel 10 further comprises a plurality of circulating fans 24 at spaced locations along the length of the tunnel. Fans 24 are employed, in conjunction with a series of associated baffles 25, to deflect cryogen gas into contact with the food product 26 as the food product traverses the length of the tunnel. The food product 26 may comprise hamburger patties, steaks, vegetable patties, or many other food products. At an intermediate location within the tunnel, preferably about midway between the spray header 16 and the exhaust plenum 17, there is a variable speed directional blower 27. Blower 27 effectively controls the proportionate flow of cryogen gas toward the entrance and exit ends of the tunnel. Thus, increasing the speed of blower 27 increases the flow of gas toward the food product entrance 14, which is also the gas exhaust end of the tunnel.

A cryogen ($LN_2$) supply (not shown in FIG. 1) is connected to tunnel 10 through a liquid supply line 31 provided with an insulator jacket 32. The cryogen liquid supply line 31 is provided with a pneumatically actuated regulating valve 33 to control the flow of $LN_2$ into the tunnel through the spray header 16. A temperature sensor 34 is positioned in tunnel housing 11, preferably at a location intermediate spray header 16 and directional blower 27, and is connected to a control system that controls the rate of input of the liquid cryogen into tunnel 10 by controlling the operation of valve 33.

As thus far described, tunnel 10 is generally conventional; it corresponds essentially to the food product freezing tunnel described in detail in Morgan et al U.S. Pat. No. 4,171,625. The food product 26 is deposited on conveyor 12 at the entrance end 17 of tunnel housing 11. As the food product advances into the tunnel, it is progressively chilled by cold nitrogen gas that is continuously deflected into contact with the food product by the circulation fans 24 and baffles 25. Thus, by the time the food product reaches the spray header 16, it is already quite cold and may be starting to freeze on the surface. At the spray header 16, the food product is subjected to an intense spray of liquid cryogen and freezing is completed quite rapidly, the $LN_2$ flashing almost instantaneously to $N_2$ gas. Shortly thereafter, the frozen food product is discharged from the exit end 15 of the tunnel. Some continuing circulation of cryogen gas is maintained in the short portion of the conveyor between the spray header 16 and the product exit 15.

During operation, and still in accordance with conventional practice, the speed of directional blower 27 may be varied to accommodate changing conditions within the tunnel, such as a variation in the rate of product flow. This has most often been accomplished by sensing the rate of flow of cryogen into the tunnel through spray header 16 and adjusting the blower speed as a direct function of the cryogen flow rate. Directional blower 27 serves to protect against excessive leakage at the tunnel exit 15.

FIG. 2 illustrates a complete cryogen flow control system 40 for tunnel 10, including the improved cryogen gas flow controls of the present invention. As shown in FIG. 2, the liquid nitrogen supply line 31 passes through a manually operable master ON-OFF valve 41 and through the liquid flow regulator valve 33 to spray header 16. In the portion 31A of the $LN_2$ supply line 31 between valves 41 and 33, the line is connected to a vapor pressure thermometer 42 and a pressure gauge 43. A spray pressure gauge 44 is connected to valve 33, completing a gauge panel 45 indicating basic liquid cryogen operating conditions to the tunnel operator. A relief valve 46 is also connected to the portion 31A of the liquid nitrogen supply line 31.

Nitrogen gas under substantial pressure, usually about twenty psi, derived from the liquified nitrogen supply, is connected to the control system 40 of FIG. 2 by the line 39. Line 39 is connected through a control pressure ON-OFF valve 47, a filter 48, and a solenoid-actuated control valve 49 to a nitrogen gas supply conduit 51. The gas supply conduit 51 is connected through a pressure regulator valve 52 to a pneumatic temperature controller 53. The gas supply line 51 is also connected to a compressor 54 through a line restrictor 55. A pressure sensing switch 56 is connected to line 51 ahead of the restriction 55. The gas supply line 51 is also connected to a manually adjustable pressure regulator valve 57 at the product exit end of the tunnel and to a similar manually operable pressure regulator valve 58 at the entrance end of the tunnel.

Compressor 54, which is equipped with appropriate relief valves 59 and 60, supplies high pressure nitrogen (in this system, forty psi) to a high pressure supply line 61 that is connected to two variable speed drive units 62 and 63. The first drive unit 62 constitutes the variable speed drive for the directional blower 27 in tunnel 10. The second drive unit 63 is employed as the drive for the exhaust blower 21. The drive unit 62 includes a pressure regulating valve 64 that is also connected to the high pressure supply line 61 and a similar pressure reduction regulator 65 is provided for the drive unit 63.

The temperature sensor bulb 34 in tunnel 10 is connected by a capillary line 67 to the pneumatic controller 53. Controller 53 produces a pneumatic signal output, in a line 68, that is connected to an automatic-manual mode control valve 69. From valve 69, the signal output from controller 53 is supplied, through a line 71 and a check valve 72, to a solenoid actuated interlock valve 73. The valve 73 also receives an alternate minimum-flow input derived from the output of the regulator valve 52 through a pneumatic circuit that includes, in sequence, a supply line 83, a manually adjustable pressure regulator valve 84, a solenoid-actuated valve 85, and a check valve 86.

The signal output the interlock from valve 73 is connected to a further signal line 76 that extends to the main liquid cryogen regulator valve 33 and to an automatic-manual mode control valve 77. The output from valve 73 is also connected to another signal line 78 that extends to the entrance end 14 of the tunnel and is there connected to another automatic-manual mode control valve 79.

The automatic-manual mode control valve 77 at the product exit end of tunnel 10 has a second input derived from the pressure regulator 57. A signal output line 81 extends from valve 77 to the variable speed pneumatic drive unit 62, affording a control input for that drive unit. Similarly, the automatic-manual control valve 79 at the entrance end of tunnel 10 has an input from the pressure regulator valve 58. The outut from valve 79 is supplied, through a control line 82, to the variable pneumatic drive unit 63 for the exhaust blower 21. Pressure gauges are provided for each of the manually adjustable regulator valves 52, 57, 58 and 84.

In considering the operation of the control system 40 for the cryogenic freezing tunnel 10, it may be assumed that the freezing tunnel is in continuous operation with all of the manual-automatic mode switches 69, 77 and 79 in their automatic position. This places the complete control of the operation of tunnel 10, including the input of liquified cryogen, the speed of directional blower 27, and the speed of exhaust blower 21, under the control of the temperature sensor 34 and the pneumatic controller 53.

Thus, the temperature at a position intermediate spray header 16 and directional blower 27 (see FIGS. 1 and 2) is sensed by the temperature sensing bulb 34, and that temperature information is supplied to controller 53 through signal line 67 (FIG. 2). As a consequence, controller 53 develops a pneumatic main thermal control signal in a range of three to fifteen psi, that is proportional to the difference between the measured temperature in the tunnel and a set point determined by setting of the controller 53. That main thermal control signal from the controller 53 is supplied, through line 68, mode control valve 69, line 71, and valves 72 and 73, to the two principal signal control lines 76 and 78.

The main pneumatic temperature control signal from line 76 is applied to the liquid flow regulator valve 33. In this manner, the rate of flow of liquified cryogen into the spray header 16 in tunnel 10 is controlled as a function of the actual temperature sensed by the sensor 34 and the set point temperature pre-set into the controller 53.

The main pneumatic temperature control signal is also supplied, through line 76, mode control valve 77 and line 81, to the variable speed drive unit 62. In drive unit 62, this signal is employed to control the rotational speed of directional blower 27. The same temperature control signal is similarly applied, through line 78 and mode control valve 79, to the variable speed drive unit 63 to control the rotational speed of the exhaust blower 21.

Whenever the temperature sensed by sensor 34 increases above a pre-set level, the pneumatic control circuits described above function to increase the input of liquified cryogen by further opening the cryogen input control valve 33. At the same time, the operating speeds of the directional blower 27 and exhaust blower 21 are increased. When the thermal sensor 34 detects a reduction in temperature, below the set point, due to the increased supply of liquid cryogen, the liquid input control valve 33 is throttled down and the speed of the two blowers 21 and 27 are decreased. With proper initial balancing of the tunnel controls, particularly by preliminary adjustment of the cryogen input control valve 33, the blower drive units 62 and 63, and the main control pressure regulator valve 52, the tunnel 10 can be adjusted for maximum efficiency in utilization of the cryogen with minimum leakage at the entrance and exit ends of the tunnel and maximum temperature rise for the cryogen gas before its release to the atmosphere.

In setting up tunnel 10, control for prevention of excessive leakage at the product exit end 15 of the tunnel is determined primarily by adjustment of the base operational speed of the directional blower 27. This blower effectively determines the rate of flow of the cryogen gas toward the exhaust (product entrance) end of the tunnel; if undue leakage is present at the product exit end 15 of the tunnel, the base speed of the blower is increased just enough to eliminate the leakage. The exhaust blower 21, on the other hand, is the primary controlling factor with respect to leakage at the product entrance end 14 of the tunnel. If excess leakage occurs there when the tunnel is being set up, the base speed for the exhaust blower is increased, but only to a level sufficient to stop the leakage.

The principal operations of tunnel 10 can also be changed over to manual control. For example, in some instances it may be desirable to change to manual control of the speed of the exhaust blower 21, as in the case of a malfunction or misadjustment of the automatic control. This is accomplished by changing the mode control valve 79 from its automatic condition to its manual condition (see FIG. 3). With this change, the speed control for the exhaust blower is attained manually by adjustment of the valve 58, which now supplies the control signal input to the exhaust blower drive unit 63 through valve 79.

In the same manner, the rotational speed of the direcional blower 27 in tunnel 10 can be changed from automatic to manual control by actuating the mode control valve valve 77 to its manual position. When this is done, the control output to line 81 is derived from the manually adjustable regulator valve 57, which is varied to change the directional blower speed as desired.

Another change to manual control may be effected by the valve 69 in the output of the controller 53. When valve 69 is changed to its manual position, the signal output on line 68, from controller 53, is blocked off and control of the cryogen input valve 33 is determined by the setting of the manually adjustable valve 52. This change also determines the inputs to the mode control valves 77 and 79; if they are in their automatic positions, valve 52 controls the blower speeds as well as the rate of input for liquid cryogen. If the mode control valve 69 is changed to manual control and the same action is taken with respect to the valves 77 and 79, the cryogen input and the speeds of the two blowers 21 and 27 are each manually adjustable, independently of the others.

The interlock circuit through line 83 and valves 84 and 85 is employed only to assure a minimum flow of liquid cryogen into the freezing tunnel 10 during start up. Thus, the regulating valve 84 is set to provide a minimum pressure output; that output becomes operational only in those instances in which it exceeds the pressure in the main control line 71.

Control of the speed of the exhaust blower 21 is critical to the achievement of maximum efficiency in the operation of the cryogenic food product freezing tunnel 10. It will be recognized that the control function exercised by adjustment of the speed of the exhaust blower is highly dependent upon the maintenance of a clear passage through the exhaust stack 18. However, accumulation of frost within stack 18 is a common phenomenon, both from moisture in the food product and because some ambient air from the workspace around tunnel 10 may be pulled into the exhaust stack through the entrance end 14 of the tunnel. Accumulation of frost within the stack 18 changes the operating characteristics for the exhaust system, including the blower 21, and ultimately results in inefficient operation.

To eliminate this difficulty and maintain continuing high efficiency, the exhaust stack 18 is wrapped with electrically heated "blankets" 91, preferably covered by an insulator jacket (not shown). The electrical heater "blankets" may comprise simple thermostatically controlled resistance heaters between two thin layers of fiberglass insulation. With a relatively low heat output from the heater "blankets", it is possible to maintain the stack 18 just warm enough to preclude the accumulation of frost on the interior surfaces of the stack, with consequent substantial improvement in overall performance of the system over a sustained period of time.

Although the invention can be implemented with many different forms of control and drive apparatus, identification of some suitable components may be of some assistance in affording a more concrete example; this information is supplied solely by way of illustration and in no sense as a limitation on the invention. Thus, the temperature controller 53 may comprise a Foxboro No. 43AP-PA42 control unit, which includes the mode control valve 69, the pressure regulator valve 52, and the pressure gauge for the valve 52. One form of variable speed drive that may be employed for the two blower drive units 62 and 63 comprises a conventional electric motor operating through a Reeves "Motodrive" unit, a mechanically variable speed coupling, equipped with a pneumatic shifting actuator such as a Reeves size 100 Airtrol cam-actuated servo-positioning device with mechanical feedback. This particular type of variable speed drive operates on the basis of a pneumatic control input in a standard range of three to fifteen psi with speed ranges of 2:1 to 10:1; a 4:1 speed range has been found quite satisfactory. However, other variable speed drive units may be employed as desired.

Electrical controls can be substituted for the described pneumatic controls, but the latter have been found more satisfactory in this demanding application. The use of nitrogen in the pneumatic control system is most desirable because it essentially eliminates moisture and consequent serious freezeup problems that are presented if air is employed.

We claim:
1. In a cryogenic food product freezing tunnel of the kind comprising:
   an elongated tunnel housing;
   conveyor means extending through the housing to transport food product from a product entrance end to a product exit end;
   cryogen input means to introduce a cryogen into the tunnel at a cryogen input location near the exit end;
   exhaust means, including an exhaust stack and an exhaust blower at the top of the stack, to exhaust cryogen gas from a location near the entrance end of the tunnel;
   a plurality of circulating fans at spaced locations along the length of the tunnel for deflecting vaporized cryogen into contact with food product traversing the tunnel;
   a directional blower, including a variable speed drive, mounted in the tunnel between the cryogen input location and the entrance end;
   and cryogen input control means, including a temperature sensor located between the directional control blower and the cryogen input location, for controlling the rate of input of cryogen into the tunnel;
   an improved cryogen gas flow control system comprising:
   a variable speed drive for the exhaust blower; and
   unified blower speed control means for varying the speed of the directional blower and the speed of the exhaust blower, as functions of the temperature in the tunnel taken at a position intermediate the cryogen input location and the position of the directional blower.

2. A cryogen gas flow control system for a cryogenic food product freezing tunnel, according to claim 1, in which the blower speed control means comprises a temperature controller, connected to the temperature sensor, that generates a master temperature control signal, and in which that master temperature control signal controls the cryogen input and the speeds of both blowers.

3. A cryogen gas flow control system for a cryogenic food product freezing tunnel, according to claim 1 or claim 2, in which the cryogen input control means and the blower speed control means are pneumatic controls employing the cryogen gas as the pneumatic control agent.

4. A cryogen gas flow control system for a cryogenic food product freezing tunnel, according to claim 3, in which the variable speed drives for the two blowers comprise pneumatic actuators employing the cryogen gas, under high pressure, as the pneumatic drive agent, the system further comprising a compressor for the cryogen gas.

5. A cryogen gas flow control system for a cryogenic food product freezing tunnel, according to claim 4, and further comprising electrical heater means on the exhaust stack for preventing accumulation of frost within the stack, thereby maintaining the exhaust characteristics essentially unchanged for any given speed of the exhaust blower.

6. A cryogen gas flow control system for a cryogenic food product freezing tunnel, according to claim 1 or claim 2, and further comprising electrical heater means on the exhaust stack for preventing accumulation of frost within the stack, thereby maintaining the exhaust characteristics essentially unchanged for any given speed of the exhaust blower.

* * * * *